Feb. 2, 1954        E. F. BUENGER ET AL        2,667,797
RING SETTING MACHINE

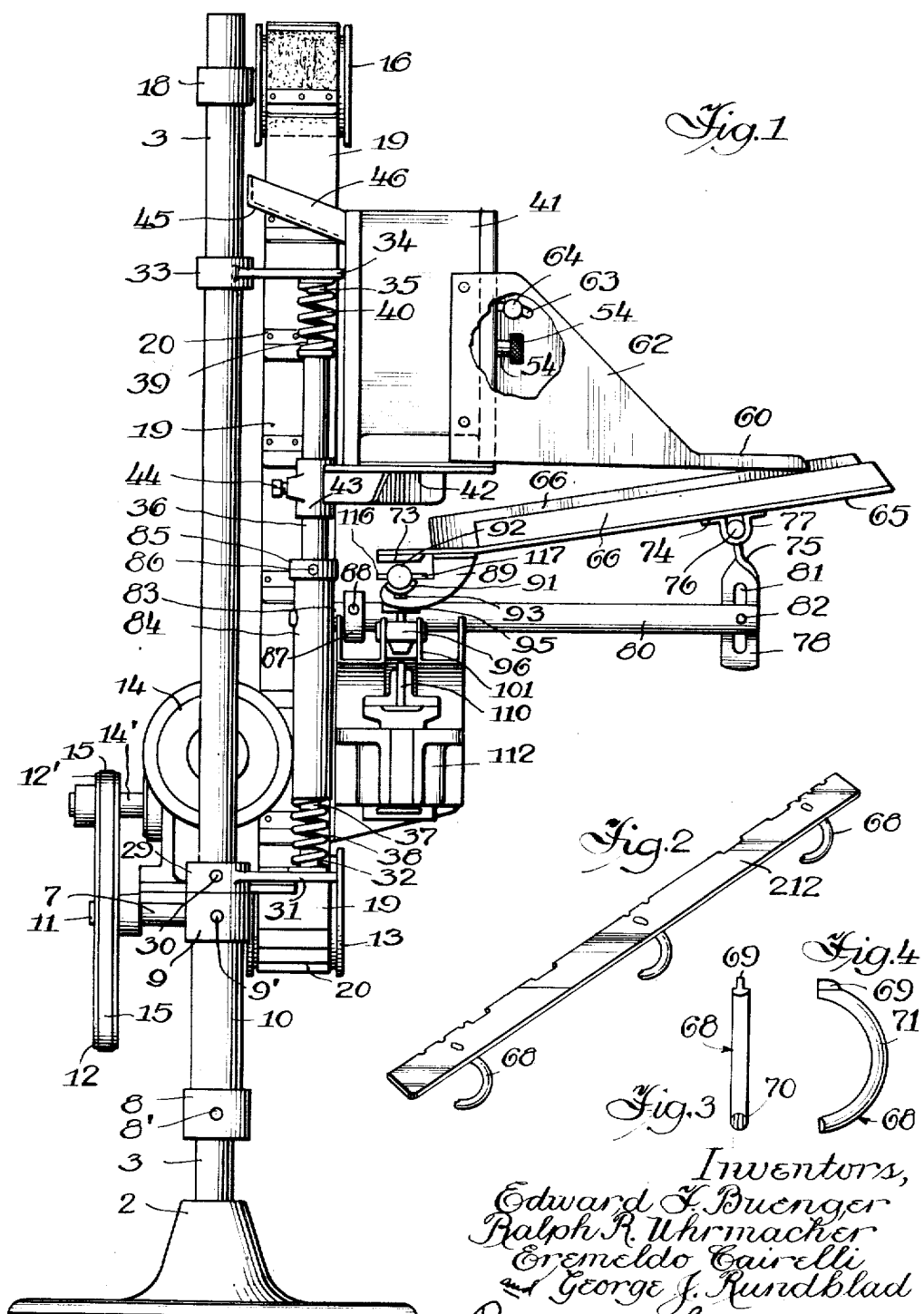

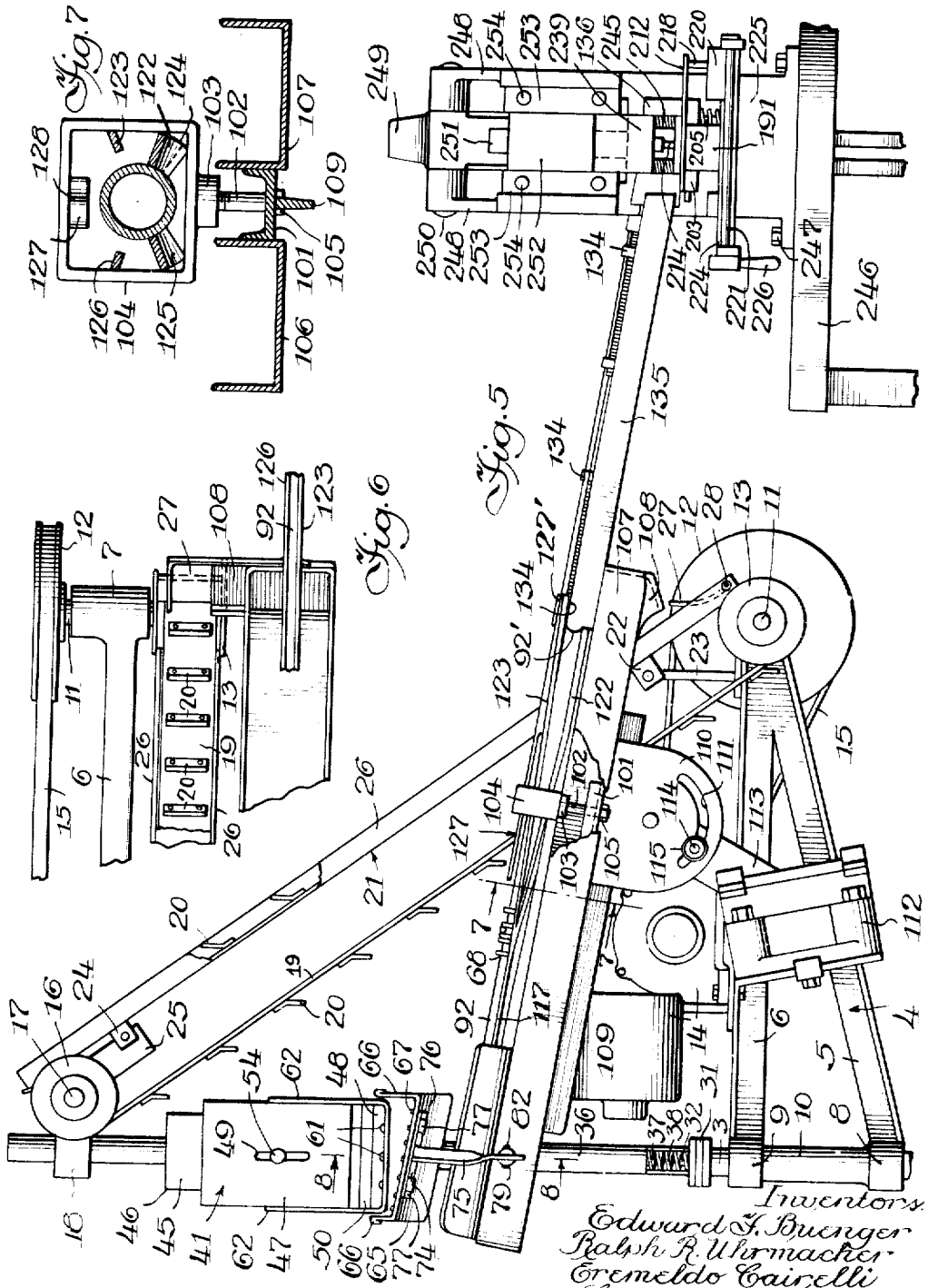

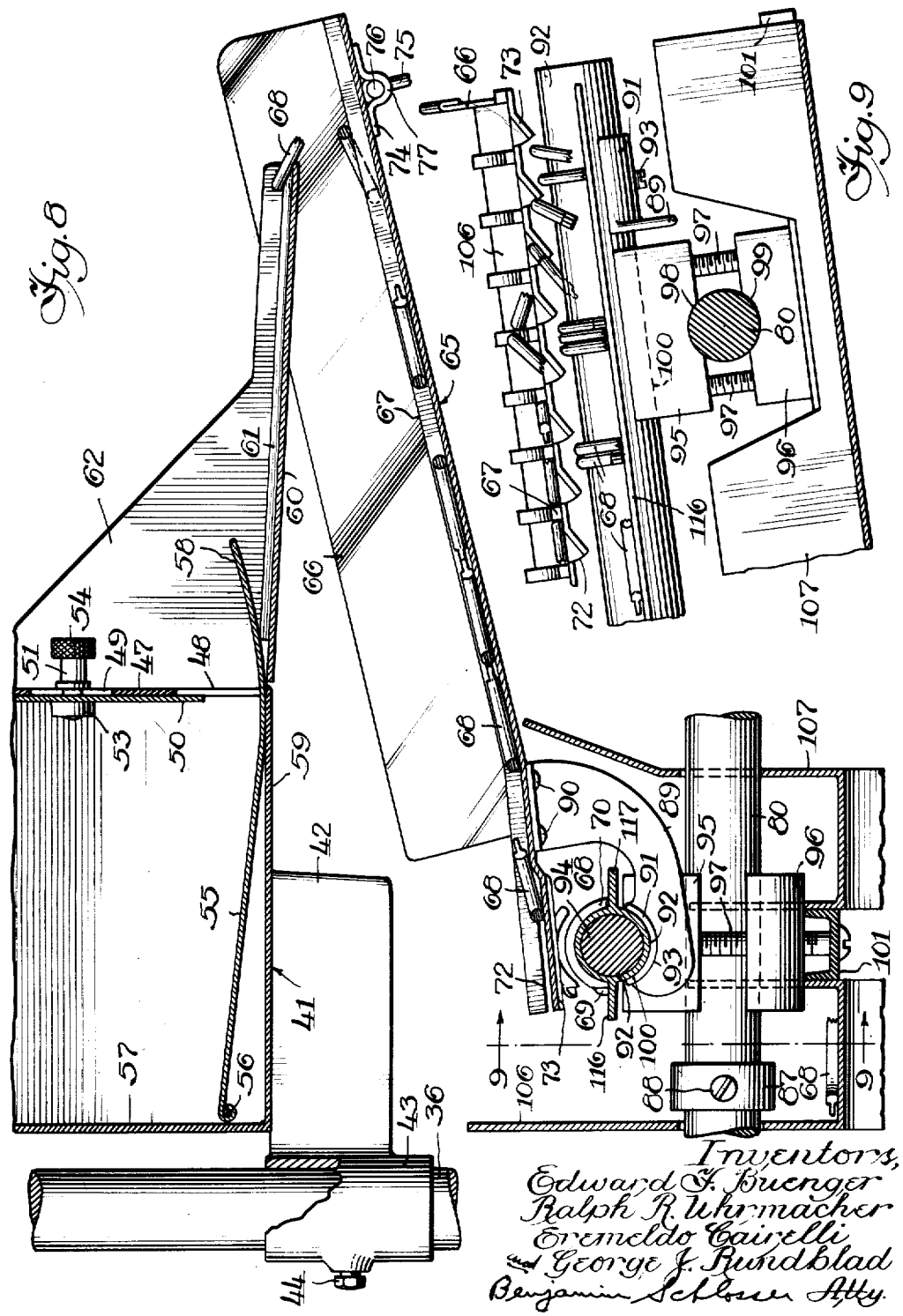

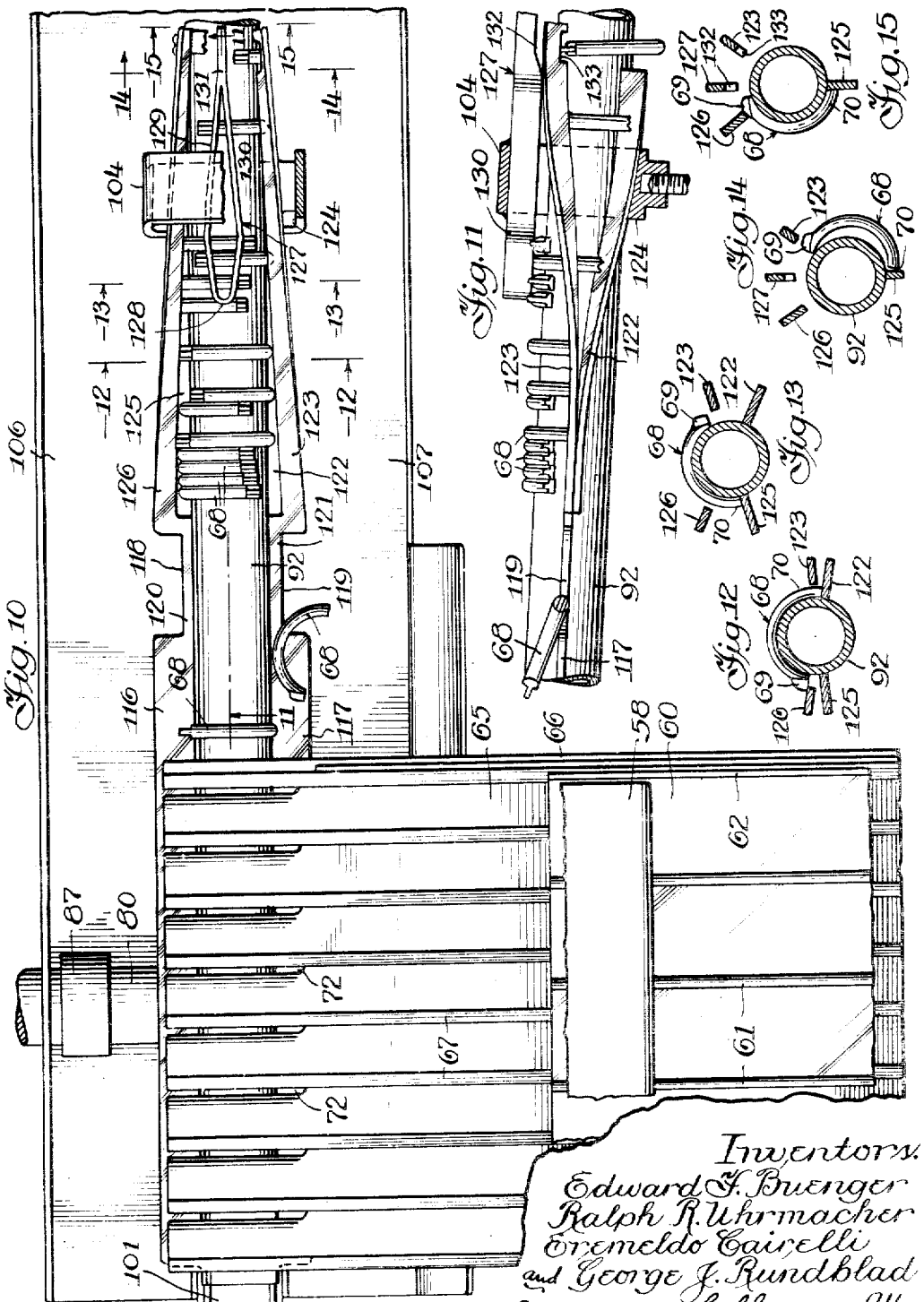

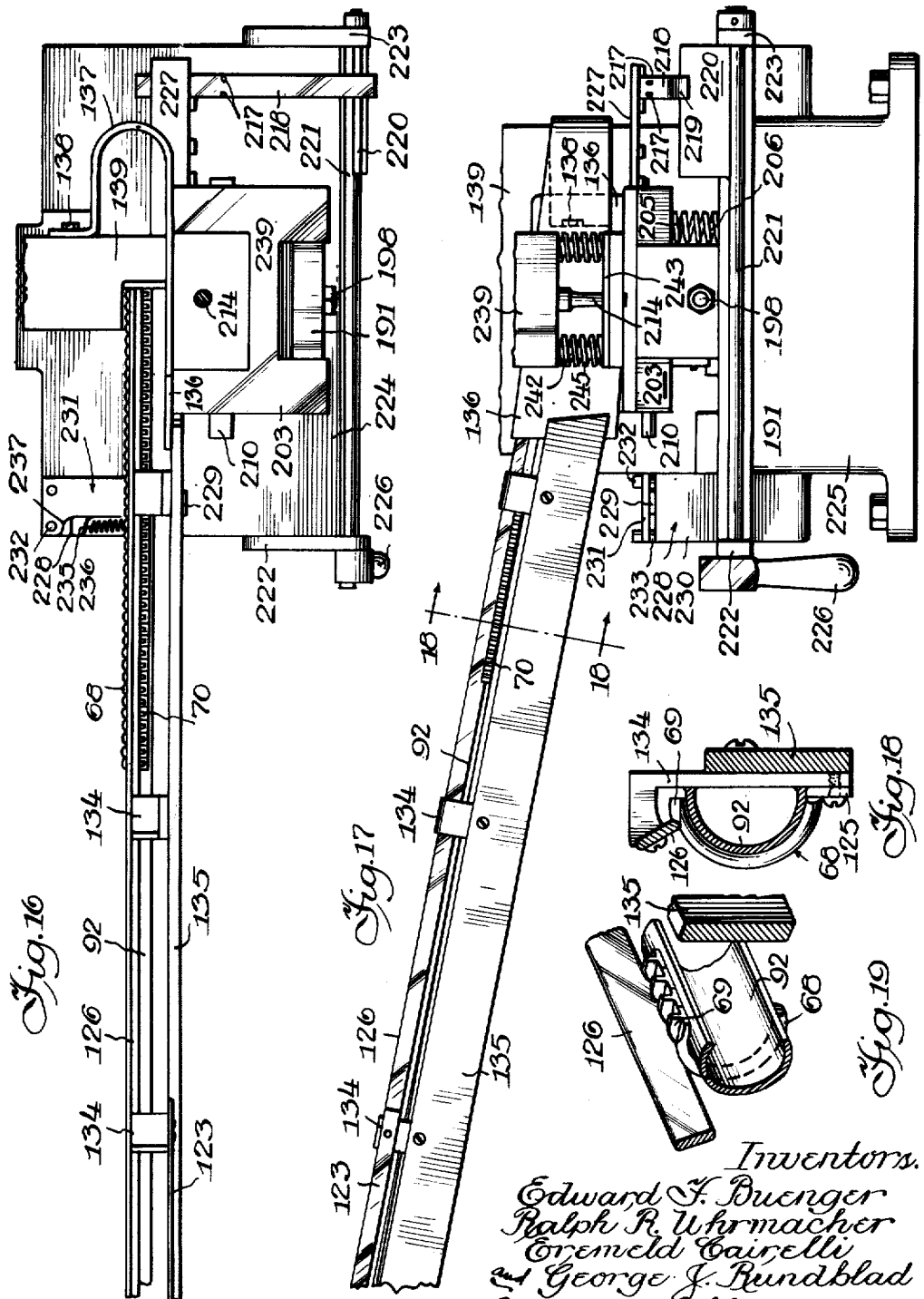

Filed Jan. 30, 1948                10 Sheets-Sheet 6

Inventors,
Edward F. Buenger
Ralph R. Uhrmacher
Eremeldo Cairelli
and George J. Rundblad
Benjamin Schlosser Atty.

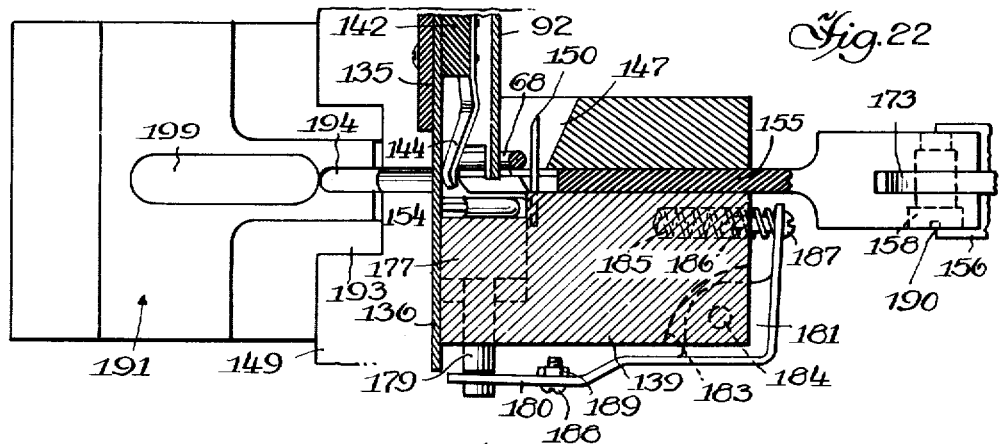
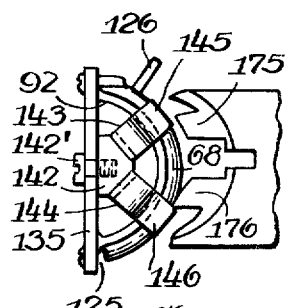
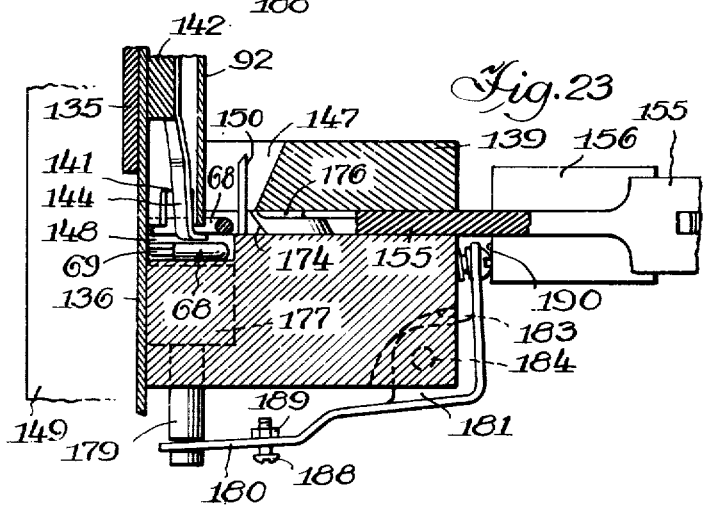
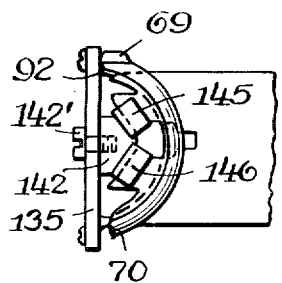
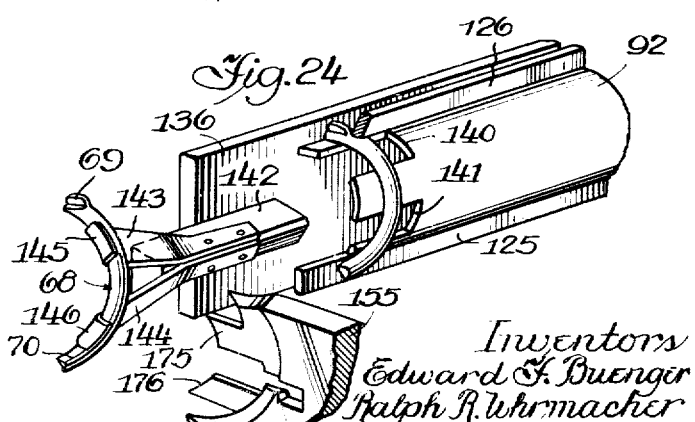

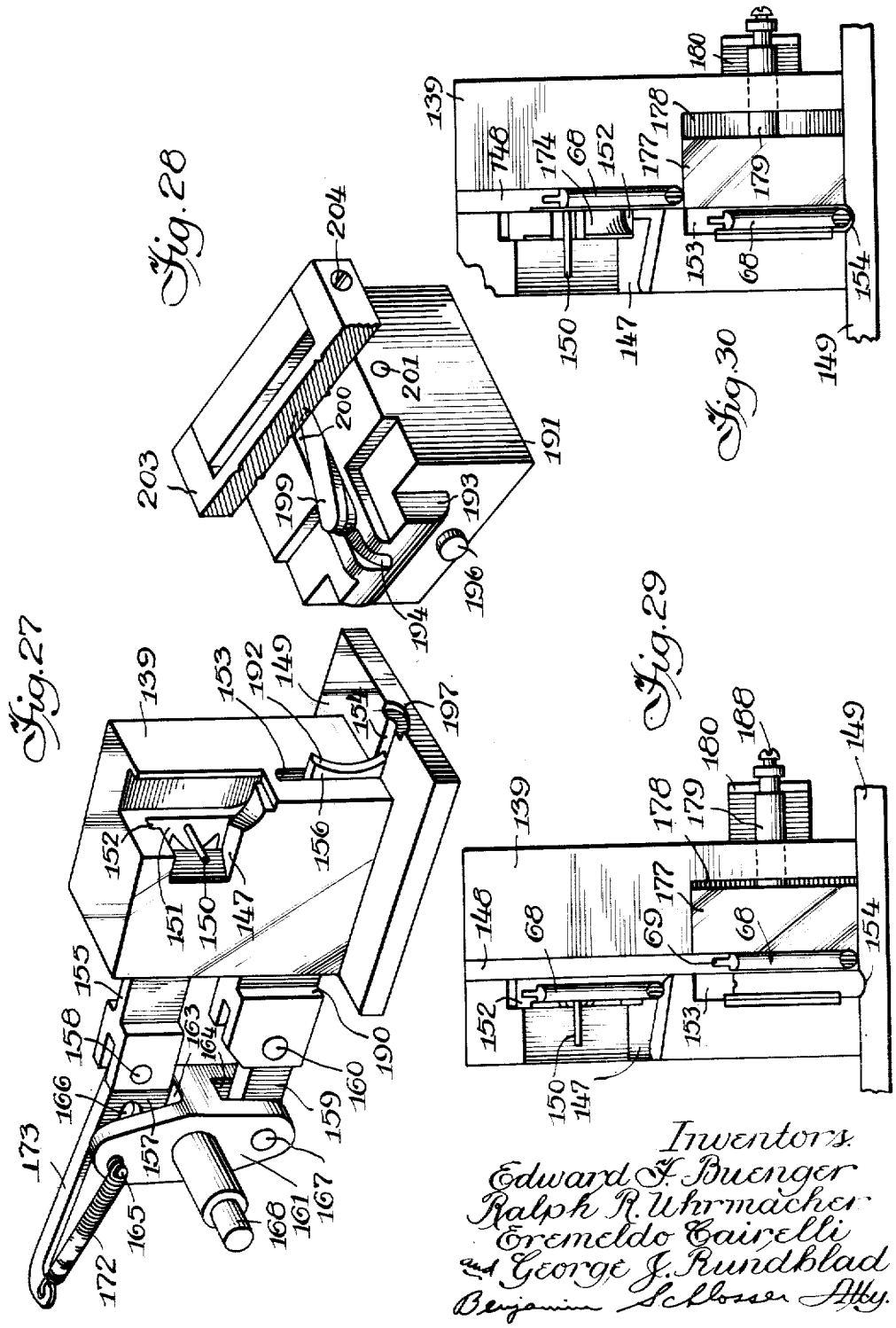

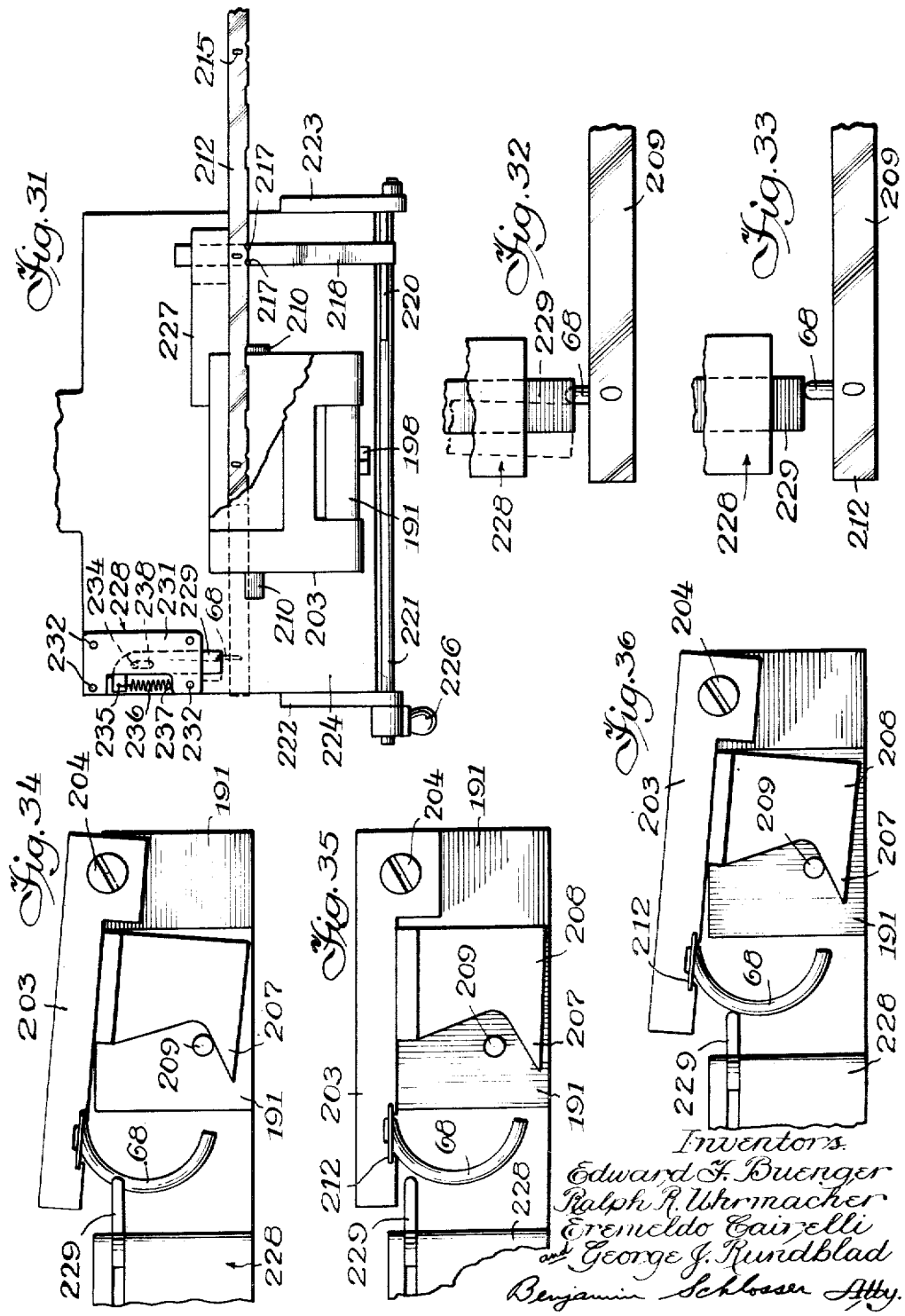

Feb. 2, 1954 E. F. BUENGER ET AL 2,667,797
RING SETTING MACHINE
Filed Jan. 30, 1948 10 Sheets-Sheet 10

Inventors,
Edward F. Buenger
Ralph R. Uhrmacher
Eremeldo Cairelli
and George J. Rundblad
Benjamin Schlosser Atty.

Patented Feb. 2, 1954

2,667,797

UNITED STATES PATENT OFFICE 2,667,797

RING SETTING MACHINE

Edward F. Buenger, River Forest, Ill., Ralph R. Uhrmacher, Charlotte, N. C., and Eremeldo Cairelli, Chicago, and George J. Rundblad, Elmwood Park, Ill., assignors to Wilson Jones Company, Chicago, Ill., a corporation of Massachusetts Application January 30, 1948, Serial No. 5,318

24 Claims. (Cl. 78—48)

This invention relates to a ring setting machine for securing the sheet holding rings in the prong plate of a loose leaf binder.

It is an object of this invention to provide automatic means for feeding rings from a hopper on to an aligning tube, moving the rings on the tube into position under a punch press for securement to a prong plate, and returning to the hopper the rings not properly aligned for the ring setting operation. It is a further object of this invention to separate one ring from the column of aligned rings on the aligning tube, to successively position selected rings in a punch press, and to individually set the rings in a prong plate. It is a further object of this invention to provide a punch press with gage means to facilitate proper initial positioning of a prong plate in a punch press for securement of one ring to said prong plate, and separate gage means cooperating with a previously set ring for positioning said prong plate for successive ring setting operations. It is a further object of this invention to provide a continuous process of feeding rings, aligning them for subsequent operations, and returning improperly aligned rings to the initial feeding position for subsequent alignment. Other objects of this invention will become apparent upon reading the following description, taken in conjunction with the accompanying drawings, in which Figure 1 is an end elevation of a ring setting machine embodying the invention;

Figure 2 is a perspective view of a prong plate with the ring sections secured thereto;

Figure 3 is a front elevation of one of the ring sections;

Figure 4 is a side elevation of one of the ring sections;

Figure 5 is a front elevation of the ring setting machine;

Figure 6 is a fragmentary top plan view showing the conveyor for returning to the hopper the rings not properly aligned for positioning under the punch press;

Figure 7 is a cross sectional view taken along the line 7—7 of Figure 5;

Figure 8 is a cross sectional view taken along the line 8—8 of Figure 5;

Figure 9 is a cross sectional view taken along the line 9—9 of Figure 8;

Figure 10 is a fragmentary top plan view of the feeding chute and the adjacent portion of the aligning tube;

Figure 11 is a longitudinal sectional view taken along the line 11—11 of Figure 10;

Figure 37:
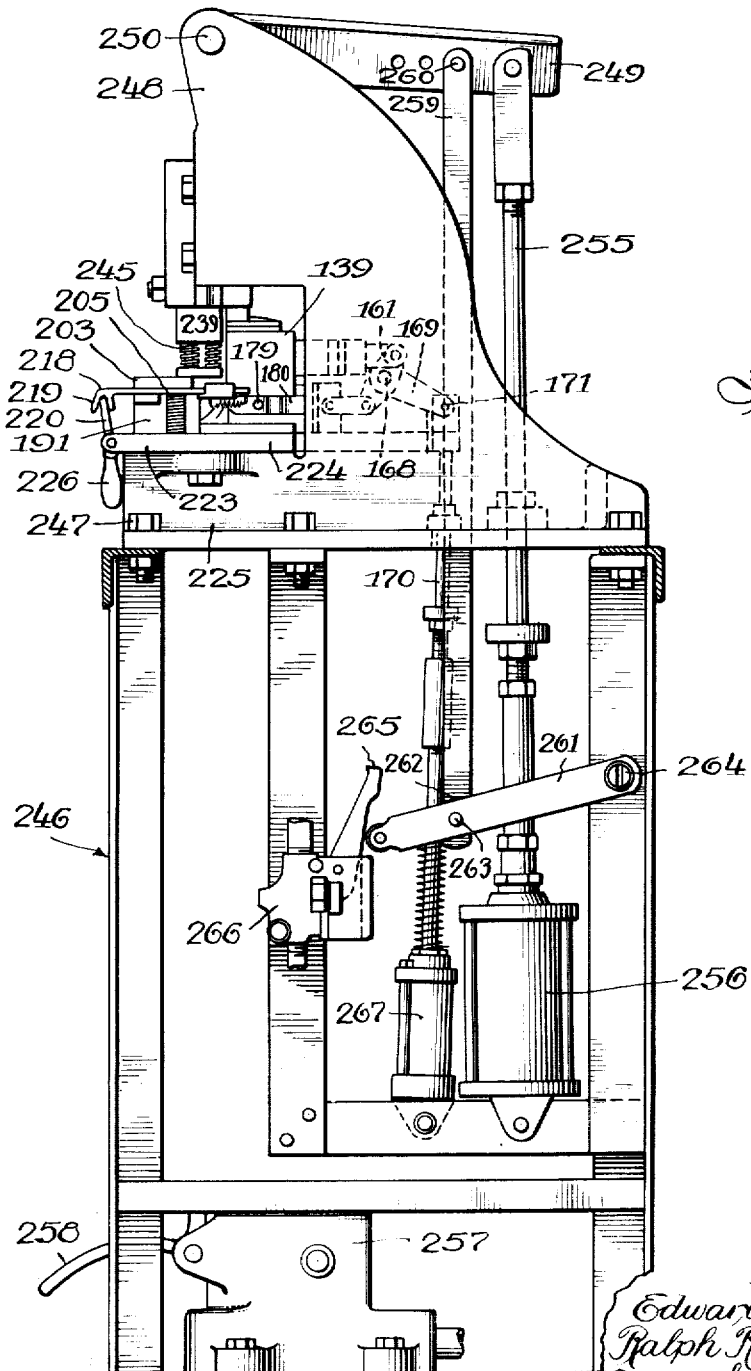

Figures 12, 13, 14 and 15 are cross sectional views taken along the lines 12—12, 13—13, 14—14, and 15—15, respectively, of Figure 10, showing the progressive adjustment of ring sections as they move towards the punch press, the ring sections in Figures 12 and 14 being improperly aligned for positioning under the punch press and the ring sections in Figures 13 and 15 being properly aligned;

Figure 16 is a fragmentary top plan view of the punch press and the adjacent portion of the aligning tube;

Figure 17 is a front elevation of the structure shown in Figure 16;

Figure 18 is a cross sectional view taken along the line 18—18 of Figure 17;

Figure 19 is a fragmentary perspective view of the same portion of the machine shown in Figure 18, with parts broken away to facilitate the illustration;

Figure 20 is a cross sectional view through the punch press showing the punch press just before the ring setting operation;

Figure 21 is a view, similar to Figure 20, showing the punch press at the finish of the ring setting operation;

Figure 22 is a cross sectional view taken along the line 22—22 of Figure 20;

Figure 23 is a cross sectional view, similar to Figure 22, showing the position of the parts after the ring separated from the column of rings has moved to its next position;

Figure 24 is a fragmentary perspective view of the separator blade, and the parts adjacent the end of the aligning tube, in disassociated position, to show the structure of the mechanism for separating the end ring from the column;

Figure 25 is a fragmentary end view of the end of the aligning tube and associated structure when the parts are in the position shown in Figure 22;

Figure 26 is a view, similar to Figure 25, showing the parts in the position indicated in Figure 23;

Figure 27 is a detail perspective view of the ring positioning mechanism;

Figure 28 is a detail perspective view of the setting die;

Figure 29 is a front elevation of the positioning mechanism showing one ring immediately after it has dropped to the bottom of the recess;

Figure 30 is a view, similar to Figure 29, showing the ring moved laterally to a position in front of the positioning blade;

Figure 31 is a top plan view of the punch press, with parts broken away to show the gage mechanism;

Figure 32 is a fragmentary top plan view of the gage just after the succeeding ring has been set in the prong plate;

Figure 33 is a view similar to Figure 32, showing the relative positions of the previously set ring and the gage at the next operational step, beyond that shown in Figure 32, when the prong plate is ready to be moved laterally to its next position;

Figure 34 is a side elevation of the gage engaged by a previously set ring to position the prong plate for a subsequent ring setting operation on the next succeeding ring, the position of the parts being that shown in dotted lines in Figure 31;

Figure 35 is a view similar to Figure 34, with the parts in the positions indicated in Figure 32;

Figure 36 is a view, similar to Figure 34, with the parts in the positions indicated in Figure 33; and Figure 37 is an end view of the end of the ring setting machine.

In the drawings, referring particularly to Figures 1, 5 and 6, the reference numeral 2 indicates a base rigidly supporting an upstanding post 3. A triangular shaped bracket 4 comprises two T-shaped members 5 and 6 welded at their meeting ends to each other and to a journal block 7. The other ends of members 5 and 6 are welded to blocks 8 and 9 which are apertured to slide over post 3, and are rigidly connected by a tubular section 10 slightly larger in diameter than post 3. The bracket 4 is secured in place by means of set screws 8' and 9' which extend through blocks 8 and 9.

A shaft 11 rotatably mounted in the journal block 7 has pulleys 12 and 13 keyed thereto on opposite sides of the block 7. A motor 14, mounted on member 6, drives the pulley 12 by means of a belt 15. The belt 15 moves around the pulley 12 and another pulley 12' keyed to a shaft 14' projecting from the motor 14. A pulley 16, similar to the pulley 13, is mounted on a shaft 17. The shaft 17 is mounted on a supporting bracket 18 which is secured to the post 3 adjacent its upper end by set screws. An endless conveyor belt 19 is mounted for rotation around the pulleys 13 and 16.

A plurality of angular fins 20 is riveted to the conveyor belt 19 at regularly spaced intervals. A channel shaped member 21 positioned adjacent one half the conveyor belt 19 has its lower end supported by a bracket 22 mounted on a post 23. The post 23 is mounted on the member 6. The upper end of the channel 21 is supported by a bracket 24. The bracket 24 is mounted on an arm 25 carried by the bracket 18. The channel shaped member 21 has upstanding side walls 26 which project above the opposite edges of the conveyor belt 19.

The purpose of the conveyor belt is to return rings that are not aligned properly for a subsequent ring setting operation to a hopper, hereinafter described The fins 20 project far enough above the conveyor belt 19 so as to retain rings dropped thereon and carry them to the upper end of the conveyor and then dump them into the hopper as rotation of the conveyor belt around the pulley 16 causes the fins to point downwardly. The side walls 26 prevent the rings from falling off the edges of the conveyor belt before the belt reaches pulley 16. A guard member 27 is pivotally mounted on a rod 28 extending between the side walls 26 adjacent their lower end to prevent the rings from falling off the conveyor belt before they are engaged by the fins 20.

A collar 29, mounted on the post 3 just above the block 8, is fixed in position by means of set screws 30. A bracket 31, welded to the collar 29, extends outwardly at right angles to the post 3, and carries a stud 32 projecting upwardly, parallel to the post 3. A collar 33, similar to the collar 29, has a bracket 34 which carries a stud 35 aligned with stud 32 and extending downwardly. A post 36 has an end portion 37 of reduced thickness resiliently mounted in a heavy coiled spring 38 which encircles the stud 32. The upper end of the post 36 is also reduced in thickness, as indicated at 39, and is similarly mounted in a spring 40 encircling the stud 35.

A hopper 41 is mounted on a support 42 which includes a collar 43 secured to the post 36 by means of a set screw 44. The hopper is adapted to receive rings from the original source of supply as well as rings already fed from the hopper and not properly aligned for the ring setting operation which are returned to the hopper by the conveyor belt 19. An inclined pan 45, extending under the upper end of the conveyor belt 19, is secured to the edge of the hopper 41 adjacent its open upper end, so that rings dropping from the upper end of the conveyor will land in the pan 45 and slide into the open end of the hopper. The pan 45 is provided with upstanding side walls 46 to prevent the rings from bouncing out of the pan when they fall from the conveyor.

Referring to Figure 8, the front wall 47 of the hopper is cut away at its bottom to form an opening 48. The front wall 47 also has an elongated slot 49 extending vertically along a portion of the front wall. A panel 50, of the same width as the front wall 47, is slidably mounted adjacent the inner surface of the front wall. A stud 51, secured to the panel 50, projects through the slot 49 and limits the sliding movement of the panel to the length of the slot. The stud is threaded into a nut 53 and can be tightened against the front wall 47 to hold the panel in any desired position to regulate the size of the uncovered portion of the opening 48. An enlarged head 54 on the front end of the stud 51 facilitates turning the stud 51 and also facilitates sliding movement of the panel to any desired position within the limits of its travel.

A plate 55 is mounted on a rod 56 extending across the hopper adjacent the bottom of the rear wall 57. The rear edge of the plate 55 is spaced above the bottom of the hopper a sufficient distance so that the rings coming down through the hopper will be directed towards the opening 48 and will not get stuck in the lower rear corners of the hopper. The front end of the plate 55 extends through the opening 48 and is curved upwardly, as indicated at 58, to control the flow of rings from the hopper. The plate 55 is substantially the same width as the bottom wall 59 of the hopper.

A spillway 60 has its rear end hinged adjacent the front edge of the bottom wall 59. The spillway 60 is preferably provided with a plurality of spaced ribs 61 projecting upwardly therefrom to spread the flow of rings more or less uniformly over the surface of the spillway. The arrangement of the ribs 61 is shown more clearly in Figure 10. The spillway is provided with side walls 62 the upper rear edges of which are provided with arcuate slots 63. A rod 64 mounted in the hopper 41 adjacent the front wall 47 has its ends passing through the slots. A screw at each end can be tightened to secure the side walls to hold the spillway at any desired angle. The rings are fed from the hopper by means of vibrations, the source of which will be hereinafter described.

A feeding chute 65 has its upper end extending under the end of the spillway 60 so that the rings will fall from the lower end of the spillway on to the upper portion of the feeding chute. As shown in Figure 5, the feeding chute 65 is inclined laterally to make it parallel to the aligning tube, hereinafter described. The feeding chute has side walls 66 and a plurality of upstanding ribs 67 extending longitudinally. The ribs 67 are spaced apart a distance proportional to the size of the rings to be set. The ring 68, shown in Figures 3 and 4 has a lug 69 projecting from one end and its opposite end 70 is notched in conventional manner. The spacing between the ribs 67 is approximately equal to the lateral distance between the ends 69, 70 and the outermost portion of the ring, indicated at 71 in Figure 4. This spacing of the ribs causes the rings to move down the feeding chute 65 longitudinally, with either end foremost, instead of haphazardly, as on the spillway.

Each individual chute, between adjacent ribs 67, is slotted longitudinally adjacent its lower edge, as indicated at 72. The slot is on the downward side of the chute, and the bottom of the chute adjacent the slot is bent downwardly, as indicated at 73 in Figure 9, so as to provide space for the rings to slide through. The same vibratory means that causes the rings to be moved from the hopper 41 and down the spillway 60 also shakes the feeding chute 65 to cause the rings to move down the chute and through the slots 72.

The upper end of the feeding chute 65 is supported by means of a bracket 74 rigidly secured to the underside of chute 65. The upper end of a link 75 is pivotally mounted on a rod 76 extending between loops 77 on the bracket 74. The link 75 is twisted through an angle of ninety degrees intermediate its length, and its lower portion 78 is positioned in the slotted end 79 of a post 80. The lower portion 78 of the link 75 is provided with an elongated slot 81. A screw 82 is tightened against the split ends of the post 80 to hold them securely against the link 75. To vary the angular adjustment of the feeding chute 65, the screw 82 is loosened, the chute is adjusted to the desired angularity and then the screw is again tightened. The other end of the post 80 is recessed to fit over a stud 83. The stud 83 is welded to a sleeve 84 mounted on the post 36. The sleeve 84 is provided at one end with a collar 85 secured to the post 36 by means of set screws 86. The end of post 80 is provided with a collar 87 having set screws 88 to tighten it against the stud 83.

The lower end of the feeding chute 65 is supported by means of a pair of brackets 89, the upper ends of which are screwed to the underside of the chute 65, as indicated at 90, Figure 8. The lower ends of the brackets 89 are welded to a semi-circular plate 91 which fits around the underside of an aligning tube 92 and is secured thereto by means of set screws 93. The portion of the aligning tube 92 to which the plate 91 is secured is reinforced by a solid rod 94 driven into the end of the tube.

The upper end of the aligning tube 92 is supported under the slots 72 by means of a pair of blocks 95 and 96. These blocks are secured against opposite sides of the post 80 by a pair of bolts 97. The lower surface of the block 95 and the upper surface of the block 96 are grooved, as indicated at 98 and 99 in Figure 9, to fit around portions of the circumference of the post. The upper surface of the block 95 is grooved at right angles to the groove 98, as indicated at 100, to fit around a portion of the circumference of the aligning tube 92. The lower end of the aligning tube is supported by the punch press in a manner hereinafter described.

The bolts 97 also support the upper end of a channel member 101. The lower end of the channel member 101 is supported by a stud 102 one end of which is threaded into a nut 103 welded to one side of a rectangular frame 104, as shown in Figures 5 and 7. A nut 105 is threaded on the other end of the stud 102 and is tightened against the lower surface of the channel 101.

As shown in Figure 7, troughs 106 and 107 are welded to opposite sides of the channel member 101. These troughs are obviously positioned on opposite sides of the aligning tube 92 and catch all the rings dropping from the feeding chute 65 that do not land on the aligning tube, as well as all those rings landing on the aligning tube that are later displaced from the tube because they are not properly aligned for the subsequent ring setting operation. A transverse runway 108, shown in Figure 5, connects the lower end of the troughs 106 and 107. The same vibratory force that feeds the rings from the hopper 41 causes the rings that have dropped into either trough to pass along the runway 108 and drop onto the conveyor belt 19 under the guard 27 so that they can be returned by the fins 20 to the hopper 41.

As shown in Figure 5, a supporting bar 109 is welded to the underside of channel member 101, and a plate 110 depending from the bar 109 is welded to the bar. The plate 110 has an arcuate slot 111 near its bottom edge. A vibrator 112, having an arm 113 rigidly secured thereto, is secured to the plate 110 by means of a pin 114 which projects from the arm 113 and is held in the slot 111 by a nut 115 threaded thereon. The arcuate slot permits adjustment of the position of the vibrator so that the vibrations may be transmitted to all necessary parts of the machine. This includes specifically the hopper 41, spillway 60, feeding chute 65, aligning tube 92, troughs 106 and 107, and runway 108, since each of these parts is supported, at least in part, by the post 36, as shown in Figure 1.

A pair of aligning bars 116 and 117 is welded to opposite portions of the aligning tube 92, as shown in Figures 8 and 10, and extended outwardly in the same plane. The bars 116 and 117 extend under the lower end of the feeding chute 65. As shown in Figure 8, the diameter of the aligning tube is such that rings 68 may straddle the aligning tube with the ends 69 and 70 indiscriminately engaging the aligning bars 116 and 117. Some of the rings will not straddle the aligning bar, but will either fall into one of the troughs 106 or 107, or will lay on one of the aligning bars 116 or 117.

As viewed in Figure 10, the aligning tube slopes downwardly to the right. Accordingly, as the vibrator 112 shakes the machine the rings 68 move towards the right. Notches 118 and 119 cut from the aligning bars 116 and 117 a short distance to the right of the edge of feeding chute 65 cause all the rings not straddling the aligning tube 92 to fall into either one of the troughs 106 or 107. Small ledges 120 and 121 are left adjacent the aligning tube at the notched areas so that rings straddling the aligning tube are moved to the right past the notches without being unseated by the vibrations.

The aligning bars 116 and 117 terminate just to the right of notches 118 and 119. As shown in Figure 11, a pair of aligning bars 122 and 123 is welded to each other and to the end of aligning bar 117. The aligning bar 122 extends downwardly from the plane of the aligning bar 117 as it extends towards the right, and it is welded to the rectangular frame 104, as indicated at 124, Figures 7 and 10. The inner edge of the aligning bar 122 engages the periphery of the aligning tube 92 along the entire length of the bar. The aligning bar 122 terminates a short distance to the right of frame 104.

The aligning bar 123 extends upwardly from the plane of the aligning bar 117 as it extends to the right, and is also welded to the frame 104. The inner edge of the aligning bar 123 is spaced from the periphery of the aligning tube 92 a distance sufficient to permit passage of the ends 70 of the rings straddling the aligning tube but not sufficient to permit passage of the headed ends 69. The consequence of this arrangement is that the rings 68 that are aligned with their headed ends forwardly, as viewed in Figure 11, have those headed ends moved upwardly and rearwardly as the vibrations cause the rings to move downwardly towards the right.

A similar pair of aligning bars 125 and 126 is secured adjacent the opposite side of the aligning tube. The bars 125 and 126 are longer than the bars 122 and 123, and extend all the way to the punch press hereinafter described. The inner edge of the aligning bar 125 engages the periphery of the aligning tube 92 along the entire length of the bar. The inner edge of the aligning bar 126 is spaced from the periphery of aligning tube 92 just as in the case of the aligning bar 123.

The rings aligned as described above with their headed ends 69 forward, have their ends 70 projecting between the bar 126 and the aligning tube to engage the bar 125. This arrangement is shown in Figure 13. The rings 68 aligned in the opposite direction have their headed ends moved upwardly and forwardly, while the ends 70 project between the bar 123 and the aligning tube to engage the bar 122.

A bar 127 extending longitudinally of the aligning tube 92, and spaced therefrom the same distance as the space between each of the bars 123 and 126 and the aligning tube, is also welded at its top edge to the frame 104. The bar 127 prevents the rings from crowding on top of each other and also guides the headed ends of the rings to the positions indicated in Figures 14 and 15. The left hand end of the bar 127, as seen in Figure 10, is rounded, as indicated at 128, and then the two branches 129 and 130 converge to a single thickness, as indicated at 131. The bar 127 is notched, on its underside, as indicated at 132, Figure 11, just to the right of point 131, so that the rings having their headed ends aligned as indicated in Figure 12 have their headed ends fall into engagement with the aligning bar 123, and the oppositely aligned rings have their headed ends fall into alignment with their headed ends in engagement with the aligning bar 126.

The aligning bar 123 is provided with a notch 133 a short distance to the right of the end of aligning bar 122, and to the right of notch 132, so that the headed ends of the rings having their headed ends arranged rearwardly pass through the notch 133 and fall into trough 107 to be returned to the hopper 41 with the rest of the improperly aligned rings. The removal of these rings from the aligning tube leaves on the tube only the rings properly aligned for the subsequent ring setting operation. The front half of the aligning tube 92 is cut away from a point slightly to the right of notch 133 as shown at 92' in Figure 5. The tube is in the form of a semi-circle, with its concave surface forward, from the point 92' to the punch press.

A plurality of brackets 134, shown in Figures 16, 17 and 18, is welded to the forward edge of the semi-circular portion of the aligning tube 92. The aligning bars 122, 123, 125 and 126 are each secured to these brackets to give them the required rigidity. The bar 122 terminates at its junction with the first bracket 134 to the right of the frame 104. The bar 127 also terminates at its junction with the same bracket, as shown at 127' in Figure 5. The aligning bar 123 terminates with the second bracket 134 from the right of frame 104, as shown in Figures 16 and 17. A flat bar 135 having one end extending into the aligning tube 92 is bolted to the brackets 134 to add to the rigidity of the structure.

The lower end of aligning tube 92 is welded to one end of a heavy flat spring 136. The spring 136 is bent into U-shape adjacent its end, as indicated at 137, Figure 16, to give the resilience necessary to permit the vibration of the lower end of the aligning tube. The opposite end of the spring 136 is bolted, as indicated at 138, to the side of a steel block 139 constituting part of the ring positioning mechanism. As shown in Figure 24, the lower end of aligning tube 92 is provided with a pair of longitudinally extending notches 140 and 141. A supporting bar 142, triangular in cross section, is secured to rear surface of the flat spring 136 by screws 142'. The bar 142 is positioned a short distance to the right of the end of aligning tube 92, as viewed in Figure 24, so that a pair of spring fingers 143 and 144, secured to adjacent sides of the triangular supporting bar 142, will engage the notches 140 and 141, respectively. The ends 145 and 146, of the spring fingers 143 and 144, are curved outwardly so as to engage the outer edge of the foremost ring 68 in the column of rings aligned on the aligning tube 92, and to retain it against lateral displacement by the pressure of the column of rings urged in its direction by gravity and vibration of the tube 92.

The block 139 is cut out, as indicated at 147 in Figure 27, through approximately half its width. The end of aligning tube 92 is positioned a very short distance from a recess 148 which extends from the top of block 139 vertically through the entire height of the block. A base 149 which may be integral with the block 139, or may be rigidly secured thereto in any suitable manner, forms a closed bottom for the recess 148. One side of the recess 148 opens into the cut out 147 so that the rings 68 can be moved from the end of the aligning tube 92 into the recess 148. The distance from the end of the aligning tube to the open side of recess 148 is preferably less than the thickness of the ring 68, so that the foremost ring cannot move out of proper alignment in its passage from the end of tube 92 into the recess 148. A pin 150 projects laterally from the wall 151 which defines the inner side of the cut out 147. The pin 150 extends parallel to the aligning tube and is spaced therefrom a distance slightly greater than the thickness of the ring 68 so that the foremost ring and the next few rings of the column of rings on the tube 92 are held against the surface of the tube by the pin.

The block 139 is also provided with two slots 152 and 153 parallel to each other in the same vertical plane. The slot 152 terminates in the cut out 147 and the wall 151 forms one wall of the slot. The slot 153 extends all the way through the block 139. A groove 154 in the base 149 is positioned immediately under the slot 153. A separator blade 155 reciprocates horizontally through the slot 152, and a positioning blade 156 reciprocates horizontally through the slot 153. The shaft of the separator blade 155 is secured to a link 157, as indicated at 158 in Figure 27, and the shaft of the positioning blade 156 is secured to a link 159, as indicated at 160.

A rocker 161, mounted on a shaft 162, has its upper end recessed, as indicated at 163 in Figure 27, and its lower end recessed, as indicated at 164. The opposite end of the link 157 fits in recess 163 and is secured to the rocker by a stud 165. The stud 165 is driven tightly into apertures in the upper end of the rocker and passes through an elongated slot 166 in link 157. The link 159 fits in recess 164 and is secured to the lower end of the rocker by a stud 167. The stud 167 is driven tightly into apertures in the lower end of the rocker and passes through a slightly larger aperture in link 159. The rocker 161 is keyed to a shaft 168 which is oscillated by a conventional pneumatic cylinder mechanism, shown diagrammatically in Figure 37, by means of an arm 169 secured to the top of a piston rod 170, as indicated at 171. The connections of the separator blade 155 and the positioning blade 156 with the rocker 161 are such that the separator blade is retracted as the positioning blade is moved forwardly, and the positioning blade is retracted as the separator blade is moved forwardly.

Normally the stud 165 engages the rear edge of the elongated slot 166. A coiled tension spring 172, having one end secured to the stud 165 and its other end to an arm 173 projecting rearwardly from the top of link 157, holds the stud 165 against the rear edge of the slot 166. However, if for any reason the separator blade gets jammed, the positioning blade can still be retracted and the upper end of the rocker will move forward in the slot 166 against the action of the spring. When the positioning blade is retracted, the ring causing the jam will ordinarily fall to the bottom of recess 148, and the separator blade 155 will be retracted with the subsequent forward movement of the positioning blade. The spring 172 will move the upper end of the rocker to the rear edge of slot 166. The regular reciprocatory movement of the separator blade and the positioning blade can, therefore, be continued without interruption.

The construction of the forward edge of the separator blade 155 is best illustrated in Figure 24. This forward edge is beveled, as indicated at 174, so that the right hand edge is very narrow. Portions of the right hand edge are cut away to leave two thin prongs 175 and 176 projecting forwardly of the blade 155. The prongs 175 and 176 are slightly narrower than the notches 140 and 141 in the end of the aligning tube so that they can pass through the notches and engage the spring fingers 143 and 144.

The prongs 175 and 176 are so positioned, relative to the tube 92, that they pass between the edge of the foremost ring 68 and the next adjacent ring in the column of rings aligned on the tube 92. The prongs 175 and 176 then engage the spring fingers 143 and 144 and press them forwardly until the curved ends 145 and 146 of the spring fingers are moved past the ring, and the bevel 174 simultaneously separates the foremost ring form the column of rings by moving it laterally off the end of aligning tube 92 into the recess 148. As the separator blade 155 is retracted, the spring fingers 143 and 144 move back into position and the next ring moves into engagement with the curved ends 145 and 146, to be held at the end of tube 92 until the next forward movement of the separator blade.

A laterally movable block 177 is positioned in a hollow chamber 178 provided in the block 139. As shown in Figures 22 and 23, block 177 is actuated by a pin 179, the end of which is mounted in an arm 180 which is substantially L-shaped. The rear end of the arm 180 extends around the back of the block 139, as shown in Figures 22 and 23. A flange 181 projecting horizontally from the arm 180 fits into a slot 183 in the corner of the block 139 and is fulcrumed thereto, as indicated at 184. A spring 185 seated in a recess 186, drilled horizontally in the back of the block 139, projects beyond the rear surface of the block and presses against the inner surface of the rear end of the L-shaped arm 180. The shank of a screw 187 threaded in the arm 180 projects into the coiled spring 185.

The spring 185 normally urges the rear end of the arm 180 rearwardly, thereby moving the block 177 to the left as viewed in Figures 29 and 30. A screw 188 projecting through the arm 180, and held in place by a nut 189, limits the inward movement of the block 177. The shaft of the positioning blade 156 has a shoulder 190 which engages the rear end of the arm 180 to move it forwardly, against the action of spring 185, as the positioning blade 156 is moved forwardly.

As the positioning blade 156 moves forwardly, the block 177 is moved to the right, as viewed in Figures 29 and 30, to clear the recess 148. The ring 68, which was separated from the column of rings by the separator blade 155 and moved into the top portion of the recess 148, drops to the bottom of the recess when the block 177 clears the recess 148. The recess 148 is of a depth approximately equal to the lateral distance between the ends 69, 70 of the ring, and its outermost portion, indicated at 71 in Figure 4, so that as the rings drop in the recess 148 the headed end 69 remains upright.

As the positioning blade 156 is moved rearwardly, the block 177 is moved to the left, as viewed in Figures 29 and 30, and pushes the ring 68 from the bottom of recess 148 into the slot 153. The end 70 of the ring is then positioned in the groove 154. Subsequent forward movement of the positioning blade 156 moves the ring out of the slot 153 into the setting die 191, properly positioned for the ring setting operation. The forward edge of the positioning blade 156 is curved to fit the outer arc of the rings, and is provided with a groove 192 in which the ring is seated during its forward motion. It will be understood that the ring positioning operations which have been described as for a single ring are continuous, and that at every stage there is a ring in each position.

The structure of the setting die is best illustrated in Figures 20, 21 and 28. The setting die is a solid steel block having an integral anvil 193 projecting at its rear. The upper portion of the anvil is grooved, as indicated at 194 in Figure 28, to receive the upper portion of the ring. The anvil is of less height than the ring to provide clearance for the ring to be moved upwardly after the setting operation, as indicated at 195 in Figures 20 and 21. When the upper portion of the ring is seated in the groove 194 with the headed end 69 under the punch, the lower end 70 abuts the end of a rod 196. The rod 196 is threaded into the setting die and projects rearwardly thereof to engage a recess 197 at the forward end of the groove 154, as shown in Figure 27. A nut 198 holds the rod 196 in position.

The upper end of the ring being positioned in the setting die is pushed against a stop member 199. The stop member 199 is pivoted in a recess 200 in the setting die, as indicated at 201. The pivotal mounting is necessary because the stop member must project above the adjacent surface of the setting die to prevent the top end of the ring from moving too far forwardly, and must be flush with the surface during the setting operation. A coiled spring 202, seated in a vertical recess in the setting die 191, and bearing against the under surface of the stop member, moves the stop member upwardly immediately after the ring setting operation, and holds it up until the next ring setting operation. The downward blow of the punch press during the ring setting operation forces the stop member 199 down against the action of spring 202.

A prong plate carrier strip 203 is pivoted adjacent the top front edge of the setting die 191, as indicated at 204. A spring 205, seated on a stud 206 projecting upwardly from a bolster plate (hereinafter described), bears against the carrier strip 203 and urges it upwardly to the position shown in Figure 20 between each ring setting operation. A side plate 207, depending from the carrier strip 203, has a foot portion 208 which engages a pin 209, projecting from the side of the setting die 191, to limit the upward movement of the carrier strip.

A pair of retaining strips 210 and 211 secured to the underside of the carrier strip form a guideway for the positioning of prong plates 212. The carrier strip is recessed above the inner edges of the retaining strips to provide space for the edges of the prong plate 212. The carrier strip has an aperture 213 slightly larger in diameter than the punch head 214. This aperture 213 is directly over the top of anvil and the stop member 199 holds the headed end 69 of the ring in registration with the aperture when the positioning blade 156 moves the ring into engagement with the anvil.

The prong plate 212 is provided with a plurality of rectangular apertures 215 (Figure 31), into each of which a ring is adapted to be set. The prong plate is inserted in the guideway from the right, as viewed in Figure 31, and is moved to the left until a pair of notches 216, adjacent the center aperture 215, is aligned with a pair of pins 217 projecting from a gage bar 218. The gage bar 218 has its end bifurcated, as indicated at 219 (Figure 37), and turned downwardly to straddle a plate 220 welded to a rod 221.

The rod 221 is rotatably mounted in two plates 222 and 223 secured to opposite sides of a bolster plate 224. The bolster plate 224 is secured to the bed 225 of the punch press. A handle 226 secured to the end of the rod 221 is turned to rotate the rod and to thereby reciprocate the gage bar 218 in a horizontal plane. When the gage bar is moved rearwardly the pins 217 will engage the notches 216 to assure proper positioning of the prong plate 212 for the first ring setting operation. The rear end of the gage bar 218 is supported on a plate 227. One end of the plate 227 is secured to the bar 218 and the other end is secured to the carrier strip 203.

A different gage 228, operable by engagement of a previously set ring with a stop member 229, is provided for positioning the prong plate for the second and third ring setting operations. The gage 228 is faster and is more easily operated than the gage bar 218, but the bar 218 is necessary because at the time of the first ring setting operation there is no previously set ring to engage the stop member 229. The gage 228 and its method of operation are illustrated in Figures 31 to 36, inclusive.

The gage 228 includes a rectangular steel block 230 (Figure 17) and a cover plate 231 secured in spaced relationship by means of bolts 232 and spacers 233. The stop member 229 is substantially L-shaped, as shown in Figure 31, and is fulcrumed at a point near the base of the L to a pin 234. The forward end of the stop member 229 is capable of lateral movement between the two front bolts 232. The rear end of the L-shaped stop member 229 has a pin 235 projecting therefrom.

A spring 236, having one end secured to the pin 235 and its other end to left hand front bolt 232, as viewed in Figure 31, urges the rear end of the stop member 229 forwardly. This spring action causes the front end of the stop member to move to the right whenever the force moving it to the left is released. The cover plate 231 is cut away, as indicated at 237, Figures 16 and 31, to provide clearance for the spring 236. The stop member 229 is provided with an elongated slot 238 (Figure 31) in which the pin 234 projects. The slot 238 permits rearward movement of the stop member 229, and the spring 236 moves the stop member forwardly whenever the force pushing it to the rear is released.

In Figure 31 the prong plate is shown in solid lines in position for the first ring setting operation with the pin 217 in engagement with the centrally disposed notches 216. After the first ring has been set the prong plate 212 is moved manually to the dotted line position with the ring 68, which has just been set, pressing the stop member 229 to the left and the carrier strip 203 in its upper position. This position is shown in side elevation in Figure 34. The downward movement of the punch press (hereinafter described) presses the carrier plate 203 downward to the position shown in Figures 32 and 35 and sets the second ring.

The downward movement of the carrier plate releases the previously set ring 68 from engagement with the stop member 229, and the spring 236 moves the stop member from the dotted line position of Figure 32 to the solid line position. As the carrier plate 203 moves upwardly, immediately after each of the second and third ring setting operations, the outer periphery of the previously set ring 68 engages the stop member 229 to move it rearwardly, as shown in Figures 33 and 36. As soon as the prong plate 212 is moved to the left the ring 68 clears the stop member 229. The spring 236 then moves the stop member to the right, back to its original position shown in solid lines in Figure 31.

The construction of the punch press is conventional and will not be described in detail. The general features are shown best in Figures 5 and 37, and the interior construction is shown best in Figures 20 and 21. The punch press includes a punch 214 and a punch holder 239. A set screw 240 holds the punch in the holder. The holder 239 has a pair of elongated recesses 241 in which the headed upper ends of a pair of bolts 242 are positioned. The lower ends of bolts 242 are screwed into a pressure pad 243 having an aperture 244 through which the punch passes for each ring setting operation.

The pressure pad 243 is positioned directly over the carrier plate 203 and moves it downwardly, from the position of Figure 20 to the position of Figure 21, as the punch is moved downwardly to set a ring 68 of the prong plate 212. A pair of heavy coiled springs 245 encircling the bolts 243 between the pressure pad 243 and the punch holder 239 cushion the shock of the blow by which the punch sets the headed end of the ring in the prong plate.

The bed 225 of the punch press is bolted to a table 246, as shown at 247, Figures 5 and 37. The bed 225 has an integral pair of side members 248 projecting upwardly therefrom. An L-shaped arm 249, fulcrumed at the upper edges of the side members 248, as indicated at 250, acts through a link 251 pivoted thereto to move the punch holder 239 and the punch 214 downwardly to set the rings. The punch holder 239 is rigidly secured to a ram 252 to which the other end of the link 251 is pivoted. The ram 252 slides vertically in guide ways provided in a pair of plates 253 secured to the front of the members 248 by bolts 254.

The arm 249 moves the punch upwardly to clear it from the carrier plate 203 so that the prong plate 212 can be moved laterally after each ring setting operation to position for the next ring setting operation. The distance between the last ring and the end of the prong plate is less than the distance between the stop member 229 and the end of the carrier strip 203. Therefore the end of the prong plate clears the carrier strip before the last set ring engages the stop member as each prong plate is moved to the left after the last ring setting operation. This arrangement facilitates the removal of each prong plate from the machine after the last ring has been set therein.

As shown in Figure 37, vertical movement of the arm 249 is controlled by a piston rod 255 operated by a pneumatic cylinder 256. The cylinder 256 is controlled by a valve 257 which is actuated by a foot lever 258. A link 259, pivoted to the arm 249, as indicated at 260, is connected at its lower end to an arm 261 through an elongated slot 262, as shown at 263. The arm 261 is pivoted at one end to one leg of the table 246, as shown at 264. The other end of the arm 261 engages a lever 265 to actuate a valve 266. The valve 266 controls the flow of air to a pneumatic cylinder 267 which operates the piston rod 170. As previously mentioned, the pneumatic system is conventional, and therefore the connection between the valves and the cylinders is not shown.

Although we have described a preferred embodiment of our invention in considerable detail, it will be understood that the description is intended to be illustrative, rather than restrictive, as many details of structure may be modified or changed without departing from the spirit or scope of our invention. Accordingly, we do not desire to be restricted to the exact structure described, except as limited by the appended claims.

We claim:

1. A ring setting machine comprising a punch press, a setting die positioned under said punch press, a prong plate carrier strip secured to said setting die, said carrier strip being adapted to hold a prong plate in a plurality of laterally spaced positions, a hopper for holding a supply of ring sections, a chute adjacent said hopper, an aligning tube leading from said chute to said punch press, and a vibrator operable to move ring sections from said hopper through said chute, on to said aligning tube, and along said aligning tube into predetermined position adjacent said punch press, said punch press being engageable with ring sections held in said predetermined position to set them in said prong plate.

2. A ring setting machine comprising a punch press, a prong plate carrying strip positioned under said punch press, said carrier strip being adapted to hold a prong plate in a plurality of laterally spaced positions, a hopper for holding a supply of ring sections, a chute adjacent said hopper, an aligning tube leading from said chute to said punch press, a vibrator operable to move ring sections from said hopper on to said chute, from said chute on to said aligning tube, and along said aligning tube to the opposite end of said aligning tube, and positioning means adjacent said last mentioned end of said aligning tube operable to move ring sections individually from said aligning tube into predetermined position in said punch press, said punch press being engageable with ring sections held in said predetermined position to set them in said prong plate.

3. A ring setting machine comprising a hopper holding a plurality of rings in haphazard arrangement, an aligning tube extending laterally and downwardly from said hopper, vibratory means for feeding a plurality of rings from said hopper onto said tube, means on said aligning tube for aligning a portion of said rings for a subsequent ring setting operation, said vibratory means being effective to feed said properly aligned rings along said aligning tube towards the lower end of said tube, and means for returning all rings not properly aligned for said ring setting operation from said aligning tube to said hopper.

4. In a ring setting machine, a hopper holding a plurality of rings in haphazard arrangement, a chute having one end positioned under said hopper, an aligning tube having one end positioned under said chute, and a vibrator operable to shake said hopper, chute and aligning tube to cause rings to move from said hopper, down said chute, on to said aligning tube, and along said aligning tube into position adjacent the end of said tube.

5. In a ring setting machine, a hopper holding a plurality of rings in haphazard arrangement, a chute having one end positioned under said hopper, an aligning tube having one end positioned under said chute, a vibrator operable to shake said hopper, chute and aligning tube to cause rings to move from said hopper, down said chute, on to said aligning tube, and along said aligning tube, and an aligning bar adjacent said aligning tube and extending longitudinally thereof in progressively varying angular relationship thereto to progressively move said rings from the initial position assumed by said rings on said aligning tube to a predetermined position adjacent the end of said tube.

6. In a ring setting machine, a downwardly inclined aligning tube, means for positioning a plurality of headed rings on said tube with the headed ends indiscriminately on either side of said tube, means for moving said rings along said tube, a pair of aligning bars extending longitudinally of said tube with the inner edges of said bars substantially in contact with the lower portion of the outer surface of said tube, said aligning bars engaging the unheaded ends of said rings, and a second pair of aligning bars extending longitudinally of said tube secured adjacent the upper portion of the outer surface at a distance therefrom sufficient to allow the unheaded portion of said rings to pass between said bars and said tube, but not sufficient to permit passage of said headed ends, said lower aligning bars being twisted from a substantially horizontal position to a substantially vertical position at the bottom of the periphery of the tube, said upper aligning bars being twisted from a substantially horizontal position to a substantially vertical position at the top of the periphery of the tube, whereby rings moved along the tube will have their headed ends engaging one of said upper aligning bars and their opposite ends passing between said one upper aligning bar and the periphery of the tube to engage the adjacent lower aligning bar.

7. In a ring setting machine, a hopper for feeding rings onto a chute, said chute being slotted adjacent one end, an aligning tube having one end positioned under said chute, a vibrator shaking said hopper, chute and aligning tube to cause rings to move from said hopper, down said chute, and along said aligning tube, an aligning bar adjacent said aligning tube for progressively moving said rings through an arc of approximately ninety degrees from the position assumed by said rings as they move on to said aligning tube to a predetermined position adjacent the end of said tube farthest removed from said chute, means for displacing from said aligning tube all rings improperly positioned for subsequent alignment, and a conveyor for receiving said improperly positioned rings and returning them to said hopper.

8. In a ring setting machine, a hopper holding a plurality of rings in haphazard arrangement, a chute, an aligning tube having one end positioned adjacent the lower end of said chute, a work station adjacent the other end of said aligning tube, a vibrator operable to shake said hopper, chute and aligning tube to move said rings from said hopper toward said work station, an aligning bar cooperating with said aligning tube to progressively change the peripheral position of said rings relative to said aligning tube as they are moved therealong until they reach a predetermined position adjacent said work station, a separator blade operable to successively move said rings into said work station, and a gage for facilitating the positioning of a prong plate over a ring positioned in said work station.

9. In a ring setting machine, a downwardly inclined aligning tube, a downwardly inclined feeding chute extending at right angles to said aligning tube and having its lower end transversely inclined to lie in a plane parallel to the top surface of said aligning tube, said chute having a plurality of slots positioned directly above said aligning tube, and means for feeding rings from said chute onto said aligning tube.

10. In a ring setting machine, a hopper, a spillway inclined downwardly from the bottom of said hopper, a downwardly inclined feeding chute having its upper end positioned under the lower end of said spillway, a downwardly inclined aligning tube having its upper end parallel to and below the lower end of said chute, a vibrator shaking said hopper, spillway, chute and aligning tube to feed rings from said hopper along said spillway, chute and aligning tube, means on said chute to align said rings in a general longitudinal direction, and a plurality of slots adjacent the lower end of said chute, the portions of said chute adjacent said slots being bent downwardly to facilitate positioning of said rings on said aligning tube as they slide through said slots.

11. In a ring setting machine, an aligning tube adapted to receive a column of rings, a separator blade operable to move the end ring laterally off said aligning tube, a block having a recess adjacent the end of said aligning tube, said recess having a closed bottom, said end ring dropping to the bottom of said recess, a second block positioned in said first block on one side of the bottom of said recess, a positioning blade on the opposite side of the bottom of said recess and spaced rearwardly thereof, said second mentioned block moving said ring laterally from the bottom of said recess into a position forwardly of said positioning blade, and means for moving said positioning blade forwardly to move said ring into predetermined position forwardly of said block.

12. In a ring setting machine, an aligning tube adapted to receive a column of rings, a punch press, a separator blade operable to move the end ring laterally off said aligning tube, a block having a recess adjacent the end of said aligning tube, said recess having a closed bottom, said ring dropping to the bottom of said recess, a second block positioned in said first block on one side of the bottom of said recess, a positioning blade on the opposite side of the bottom of said recess and spaced rearwardly thereof, said second mentioned block moving laterally to move said ring from the bottom of said recess into a position forwardly of said positioning blade, said laterally movable block in its last mentioned position preventing the movement of the next successive ring to the bottom of said recess, means for moving said positioning blade forwardly to move said end ring into predetermined position under the punch of said punch press, said laterally movable block returning to its initial position as the positioning blade is moved forwardly to permit movement of the next successive ring to the bottom of said recess.

13. In a ring setting machine, an aligning tube adapted to receive a column of rings, a punch press, a separator blade operable to remove the end ring laterally off said aligning tube, a block having a recess adjacent the end of said aligning tube, said recess having a closed bottom, said end ring dropping to the bottom of said recess, a laterally movable block on one side of said recess, a positioning blade on the opposite side of the bottom of said recess and spaced rearwardly thereof, said laterally movable block moving said end ring laterally from the bottom of said recess into a position forwardly of the positioning blade, and means for moving said positioning blade forwardly to move said ring into predetermined position under the punch of said punch press, said separator blade, laterally movable block and positioning blade being synchronized so as to assure continuity of operation on successive rings.

14. In a ring setting machine, ring positioning means comprising a block provided with a pair of horizontal slots aligned vertically with each other and a vertical recess contiguous to one side of said slots, a separator blade reciprocable in one of said slots, a positioning blade reciprocable in said other slots, and a second block laterally movable in said first mentioned block transversely across the lower portion of said vertical recess.

15. In a ring setting machine, ring positioning means comprising a block provided with a pair of horizontal slots aligned vertically with each other and a vertical recess contiguous to one side of said slots, a separator blade reciprocable in one of said slots, a positioning blade reciprocable in said other slot, a second block laterally movable in said first mentioned block transversely across the lower portion of said vertical recess, means synchronizing the movement of said blades and said second mentioned block, and means stopping the inward movement of said second mentioned block at the side of said vertical recess contiguous to the side of said slots.

16. In a ring setting machine, ring positioning means comprising a block provided with a pair of horizontal slots aligned vertically with each other and a vertical recess contiguous to one side of said slots, a separator blade in one of said slots having a shank projecting rearwardly of said block, a positioning blade in said other slot having a shank projecting rearwardly of said block, and a rocker secured to both of said shanks and operable to reciprocate said blades alternately in opposite directions.

17. In a ring setting machine, ring positioning means comprising a block provided with a pair of horizontal slots aligned vertically with each other and a vertical recess contiguous to one side of said slots, a separator blade in one of said slots having a shank projecting rearwardly of said block, a positioning blade in said other slot having a shank projecting rearwardly of said block, a second block laterally movable in said first mentioned block transversely across the lower portion of said vertical recess, a rocker secured to both of said shanks and operable to reciprocate said blades alternately in opposite directions, means on one of said shanks effective to move said second mentioned block in one lateral direction during one stroke of said one shank, and means for moving said second mentioned block in the opposite direction during the opposite stroke of said one shank.

18. In a ring setting machine, a setting die, an anvil projecting from said setting die, a groove in said anvil to receive one portion of a ring, and a stop member engageable with one end of a ring seated in said groove to help position said ring, said stop member being pivoted in said setting die.

19. In a ring setting machine, means for aligning a plurality of rings, a punch press having an anvil shaped to receive a ring, ring positioning means for moving a ring from said aligning means to said anvil, a prong plate carrier mounted in said punch press, and gage means adjacent said carrier, said gage means engageable with an apertured prong plate slidably mounted in said carrier to facilitate sequential lateral positioning of said prong plate in a plurality of predetermined positions relative to said anvil, each of said positions of said prong plate being effective to align one of its apertures with a ring positioned on said anvil.

20. In a ring setting machine, a prong plate carrier, means for sequentially setting a plurality of rings in a prong plate mounted in said carrier, and a gage, said gage engaging a previously set ring to facilitate lateral positioning of a prong plate for the next ring setting operation.

21. In a ring setting machine, a prong plate carrier, a gage for facilitating lateral positioning of a prong plate in said carrier for the initial ring setting operation, and a separate gage engageable with previously set rings for setting of succeeding rings in the same prong plate.

22. In a ring setting machine, a prong plate carrier, and a gage facilitating lateral positioning of a prong plate in said carrier, said gage including a stop member movable in two directions in a horizontal plane by engagement with a ring set in said prong plate, and a spring operable to move said stop member back to its initial position from either displaced position automatically upon disengagement of said ring from said stop member.

23. A ring setting machine comprising a work station at which properly positioned rings are set in a prong plate, a hopper for holding a plurality of rings in haphazard arrangement, a tube slanting downwardly from a point adjacent said hopper to a point adjacent said work station, means for moving rings from said hopper on to said tube, means for moving said rings on said tube towards said work station, means for removing from said tube all rings not positioned properly for the ring setting operation before said rings reach said work station, and an endless conveyor belt for returning to said hopper all rings removed from said tube by said last mentioned means.

24. In a ring setting machine, a hopper for holding a plurality of rings in haphazard arrangement, a tube extending laterally and downwardly from a point adjacent said hopper, means for moving rings from said hopper on to said tube, means for moving said rings along said tube, means intermediate the length of said tube for removing from said tube all rings not positioned properly for a subsequent work operation on said rings, and an endless conveyor belt for automatically returning to said hopper all rings removed from said tube by said intermediate means.

EDW. F. BUENGER.
RALPH R. UHRMACHER.
EREMELDO CAIRELLI.
GEORGE J. RUNDBLAD.

References Cited in the file of this patent

UNITED STATES PATENTS

| Number | Name | Date |
|---|---|---|
| 450,482 | Coxe | Apr. 14, 1891 |
| 1,187,114 | Von Lieven | June 13, 1916 |
| 1,863,314 | Phelps et al. | June 14, 1932 |
| 2,186,652 | Orth et al. | Jan. 2, 1940 |
| 2,327,849 | Wolfe | Aug. 24, 1943 |
| 2,337,667 | Kuehlman | Dec. 28, 1943 |
| 2,360,991 | Ward | Oct. 24, 1944 |
| 2,528,779 | Pinney | Nov. 7, 1950 |

FOREIGN PATENTS

| Number | Country | Date |
|---|---|---|
| 577,028 | Germany | May 22, 1933 |